(12) United States Patent
Pena

(10) Patent No.: US 7,475,998 B1
(45) Date of Patent: Jan. 13, 2009

(54) TELESCOPING INSPECTION MIRROR WITH INTEGRATED LIGHT

(76) Inventor: Samuel J. Pena, 6841 Arlene Dr., Winton, CA (US) 95388

( * ) Notice: Subject to any disclaimer, the term of this patent is extended or adjusted under 35 U.S.C. 154(b) by 16 days.

(21) Appl. No.: 11/592,389

(22) Filed: Nov. 3, 2006

(51) Int. Cl.
*G02B 7/182* (2006.01)

(52) U.S. Cl. ....................................... 359/875

(58) Field of Classification Search ................. 359/871, 359/872
See application file for complete search history.

(56) References Cited

U.S. PATENT DOCUMENTS

| | | |
|---|---|---|
| D341,220 S | 11/1993 | Eagan |
| 5,428,484 A | 6/1995 | Baker |
| D379,656 S | 6/1997 | Reynolds et al. |
| 5,636,918 A * | 6/1997 | Lott ........................... 362/139 |
| 5,915,825 A | 6/1999 | Weister |
| 5,951,142 A * | 9/1999 | Wang et al. ................ 362/109 |
| 6,069,340 A | 5/2000 | DeCanio |
| 6,210,009 B1 | 4/2001 | Daly |
| 6,550,926 B2 | 4/2003 | Berger |
| 6,565,229 B2 | 5/2003 | Bliss |

* cited by examiner

*Primary Examiner*—Euncha P Cherry

(57) ABSTRACT

The invention is an inspection mirror with an adjustable light source attached to the mirror. The adjustable light source has a flexible shaft that can adjust to illuminate the surrounding area as well as the area being reflected by the mirror. The invention has a rotating bracket, which connects a telescoping handle to the mirror. The adjustable light source has a battery pack and on/off switch that will be located and connected to the backside of the mirror. The invention has alternative embodiments, which include an added A/C adapter charger for the flexible light source. Another alternative embodiment is to integrate a digital camera into the invention. Varieties of alternative embodiments are depicted and vary in the light source used and the orientation of the light source with respect to the mirror.

3 Claims, 9 Drawing Sheets

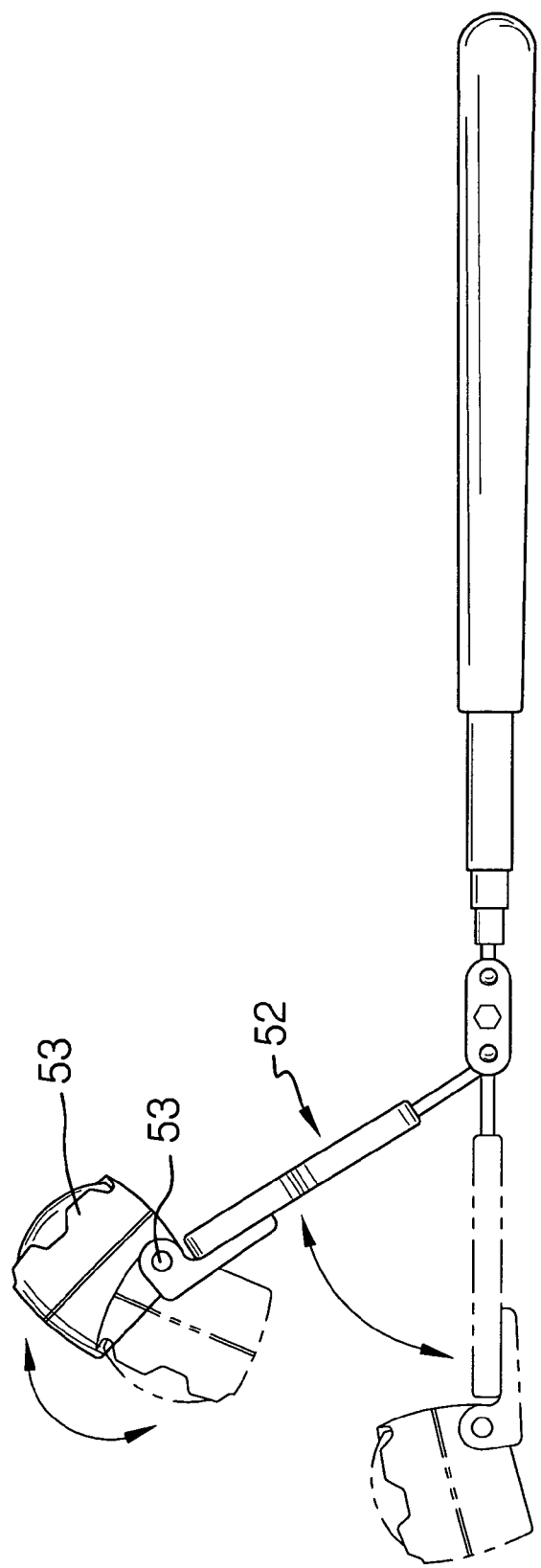

TELESCOPING INSPECTION MIRROR WITH INTEGRATED LIGHT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to an inspection mirror with an external light source.

Typically an inspection mirror with an integrated light source or external light source beams light towards the surface of the mirror. This invention seeks to permit an individual to view a much larger surrounding work area.

B. Prior Art

The Berger patent (U.S. Pat. No. 6,550,926) is directed to an inspection device having a telescoping length, interchangeable mirrors, and light diodes.

The Goodenough patent application Publication (U.S. Patent No. US 2003/0128447) is directed towards an inspection mirror device having an optional light source.

The Daly patent (U.S. Pat. No. 6,210,009) is directed towards a hand held telescoping mirror that is used for hard to see areas.

The DeCanio patent (U.S. Pat. No. 6,069,340) is directed to an electrode holder mirror device.

The Baker patent (U.S. Pat. No. 5,428,484) is directed to a hand-held telescoping mirror device which includes a light bulb situated to provide a broad illumination region.

The Bliss patent (U.S. Pat. No. 6,565,229) is directed to a telescopic flashlight.

The Reynolds et al. patent (U.S. Pat. No. Des. 379,656) illustrates a design for a telescopic mirror.

The Weiser patent (U.S. Pat. No. 5,915,825) is directed to an illuminated mirror tool.

The Lott patent (U.S. Pat. No. 5,636,918) is directed to a precision sighting device for viewing obstructed areas.

The Eagan patent (U.S. Pat. No. Des. 341,220) illustrates an ornamental design for a hand held extension light.

BRIEF SUMMARY OF THE INVENTION

The invention is an inspection mirror with an adjustable light source attached to the mirror. The adjustable light source has a flexible shaft that can adjust to illuminate the surrounding area as well as the area being reflected by the mirror. The invention has a rotating bracket, which connects a telescoping handle to the mirror. The adjustable light source has a battery pack and on/off switch that will be located and connected to the backside of the mirror. The invention has alternative embodiments, which include an added A/C adapter charger for the flexible light source. Another alternative embodiment is to integrate a digital camera into the invention. Varieties of alternative embodiments are depicted and vary in the light source used and the orientation of the light source with respect to the mirror.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 9 illustrates a side view of the alternative embodiment illustrated in FIG. 8.

DETAILED DESCRIPTION OF THE EMBODIMENT

Figure 1:
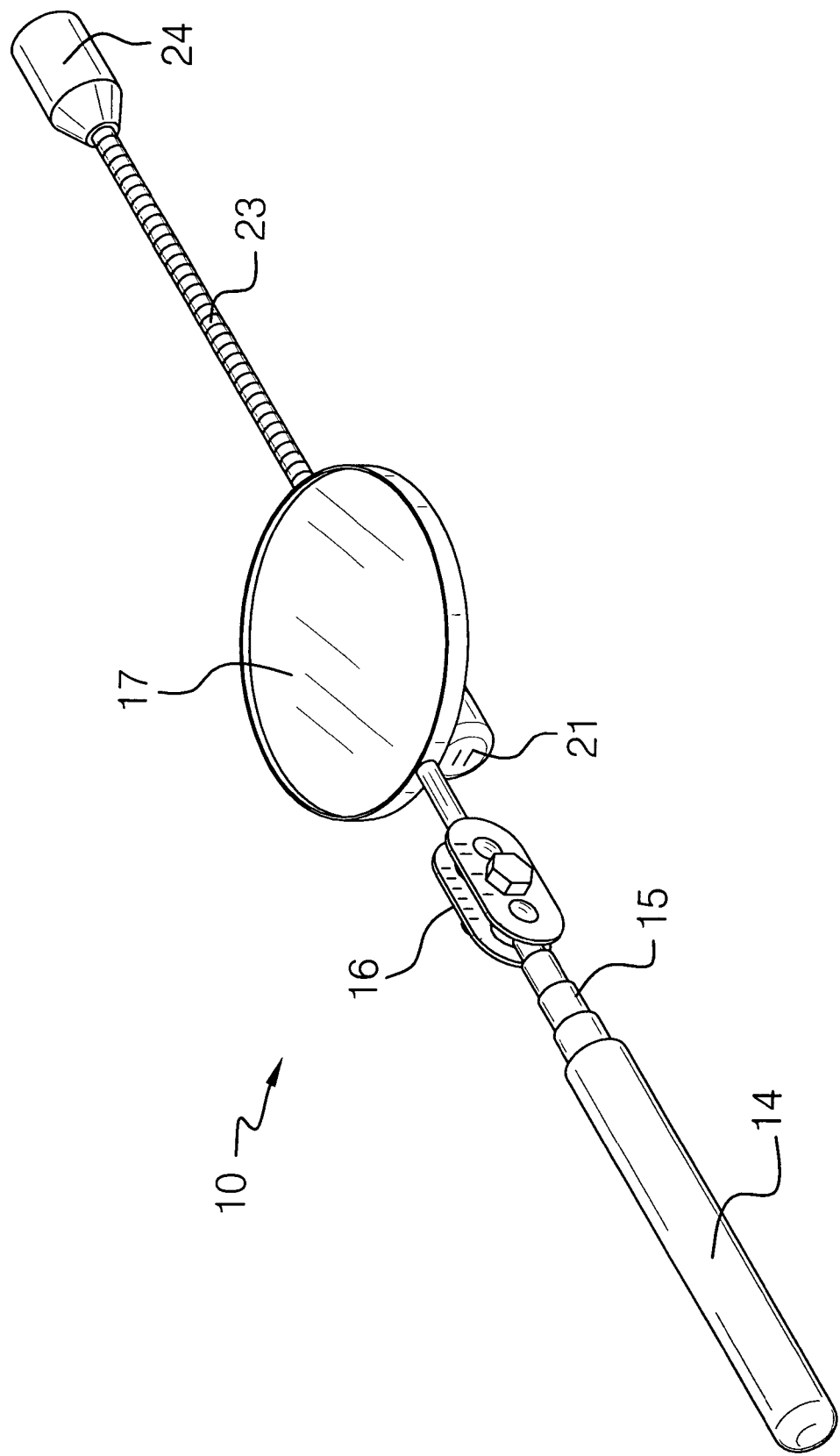
FIG. 1 illustrates an isometric rendering of the front of the invention.
Figure 2:
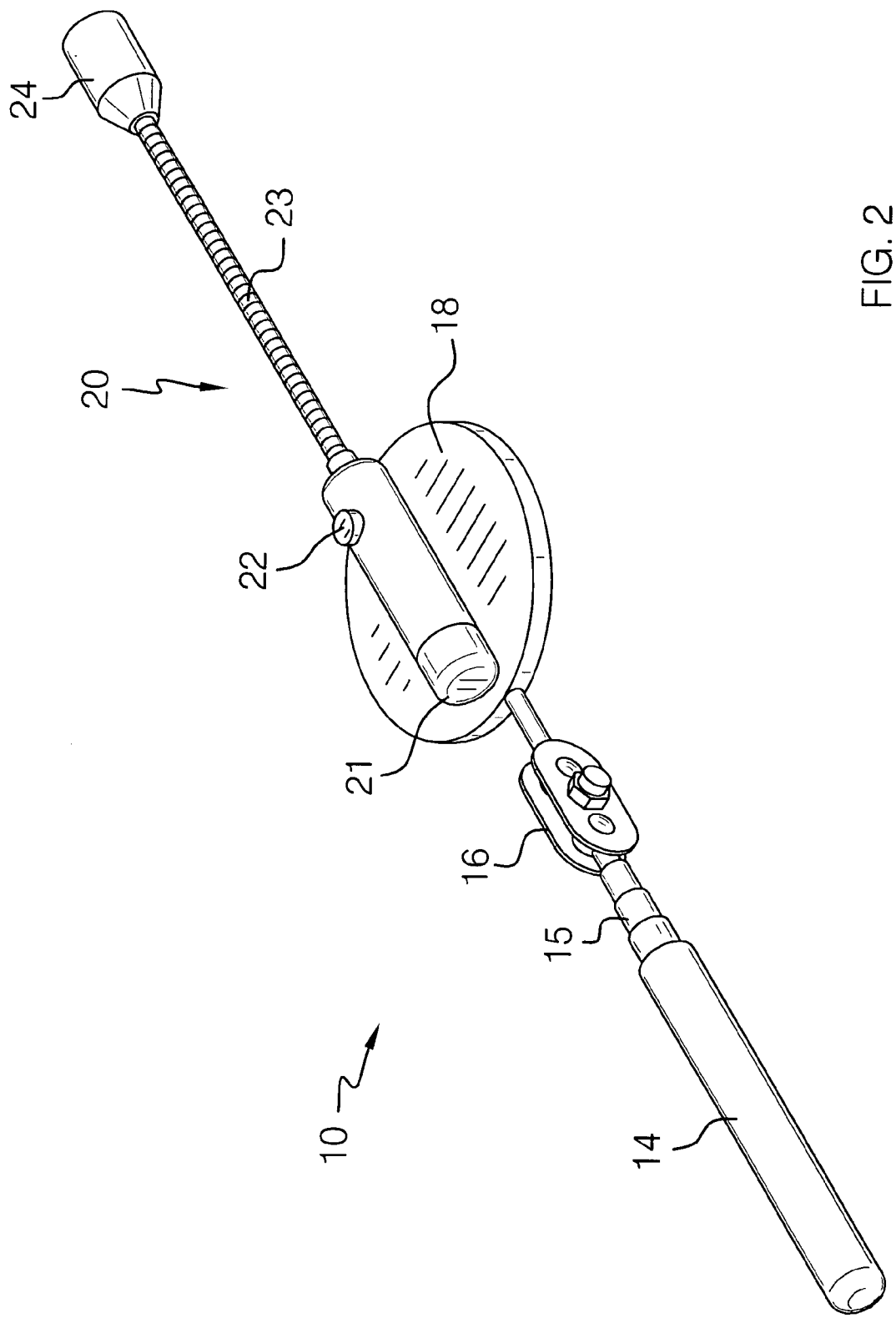
FIG. 2 illustrates an isometric rendering of the back of the invention.
Figure 3:
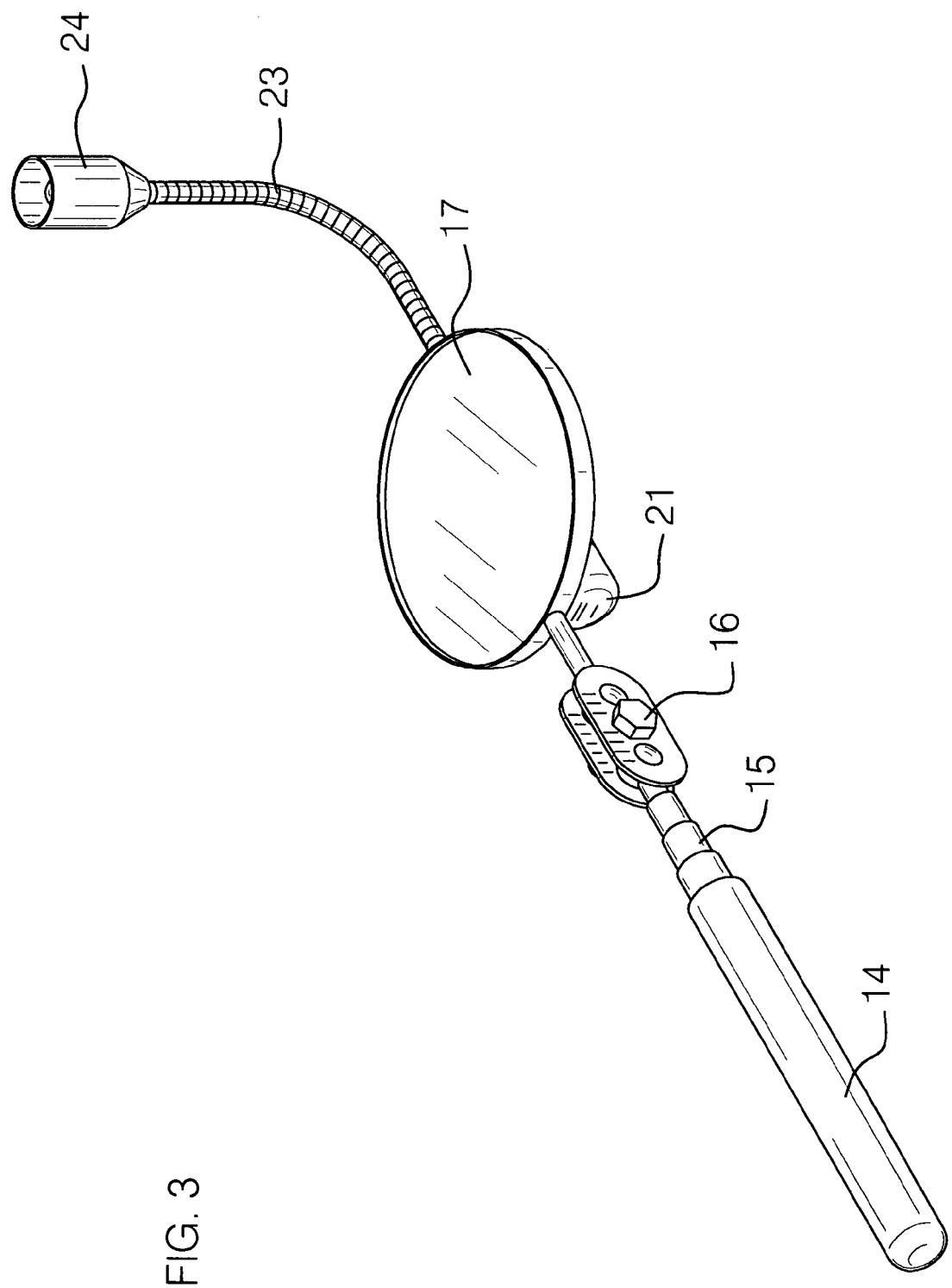
FIG. 3 illustrates an isometric rendering of the front of the invention in a flexed position.
Figure 4:
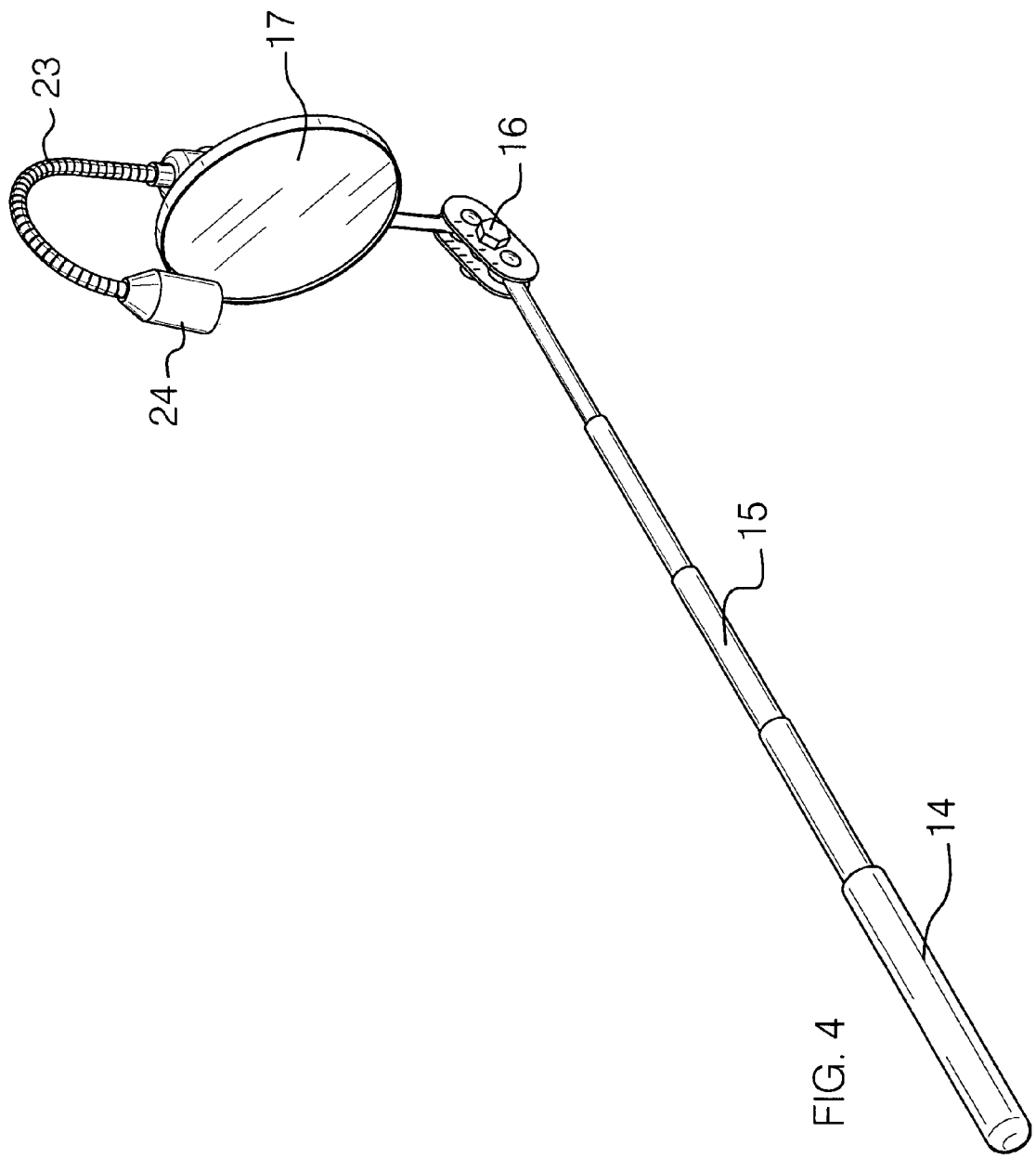
FIG. 4 illustrates an isometric rendering of the invention extended, flexed, and pivoted.

Detailed reference will now be made to the preferred embodiments of the present invention, examples of which are illustrated in the accompanying drawings. Referring to FIGS. 1-4, the invention in accordance with a preferred embodiment of an inspection mirror 10 that includes a telescoping handle 15, which is connected to a rotating bracket 16. The telescoping handle 15 has a handle grip 14. The other end of the rotating bracket 16 connects to a mirror 17.

A flex shaft light emitting diode (LED) structure 20 is made of a battery case 21 that has an on/off switch 22. At the opposite end of the batter case 21 is attached a flex shaft 23. At the opposite end of the flex shaft 23, is a light emitting diode (LED) 24. The battery case 21 of the flex shaft light emitting diode structure 20 is connected to a mirror base 18.

Figure 5:
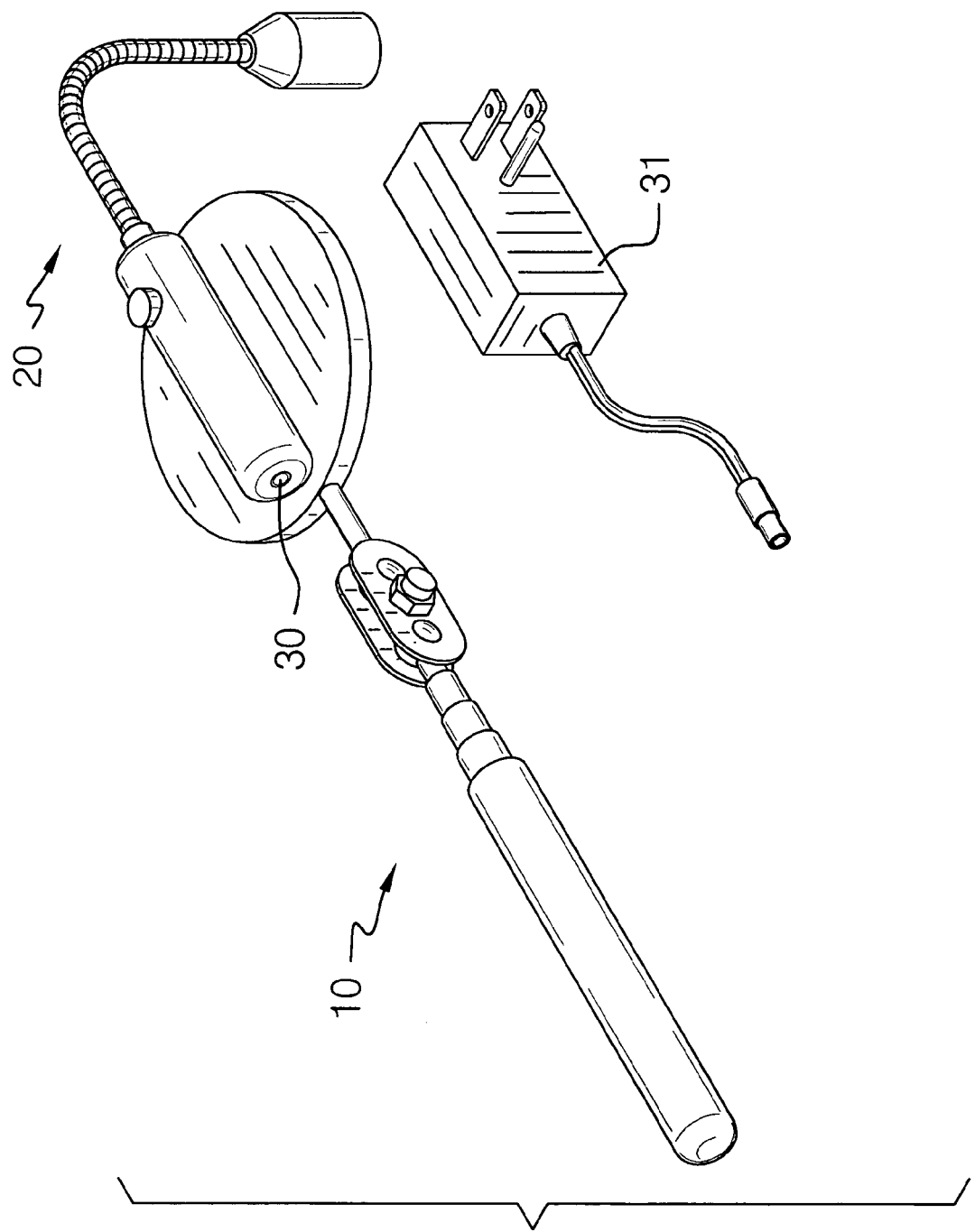
FIG. 5 illustrates an isometric rendering of the back of the invention with a rechargeable embodiment and AC adapter/charger.

Detailed reference will now be made to a rechargeable embodiment of the invention by referring to FIG. 5. The inspection mirror 10 with a flex shaft light emitting diode (LED) 20. The flex shaft light emitting diode 20 includes a charging jack 30 that is located at an end of the batter case 21 of the flex shaft light emitting diode 20. A corresponding AC adapter/charger 31 plugs into the charging jack 30, and charges up the battery case 21 of the flex shaft light emitting diode (LED) 20.

Figure 6:
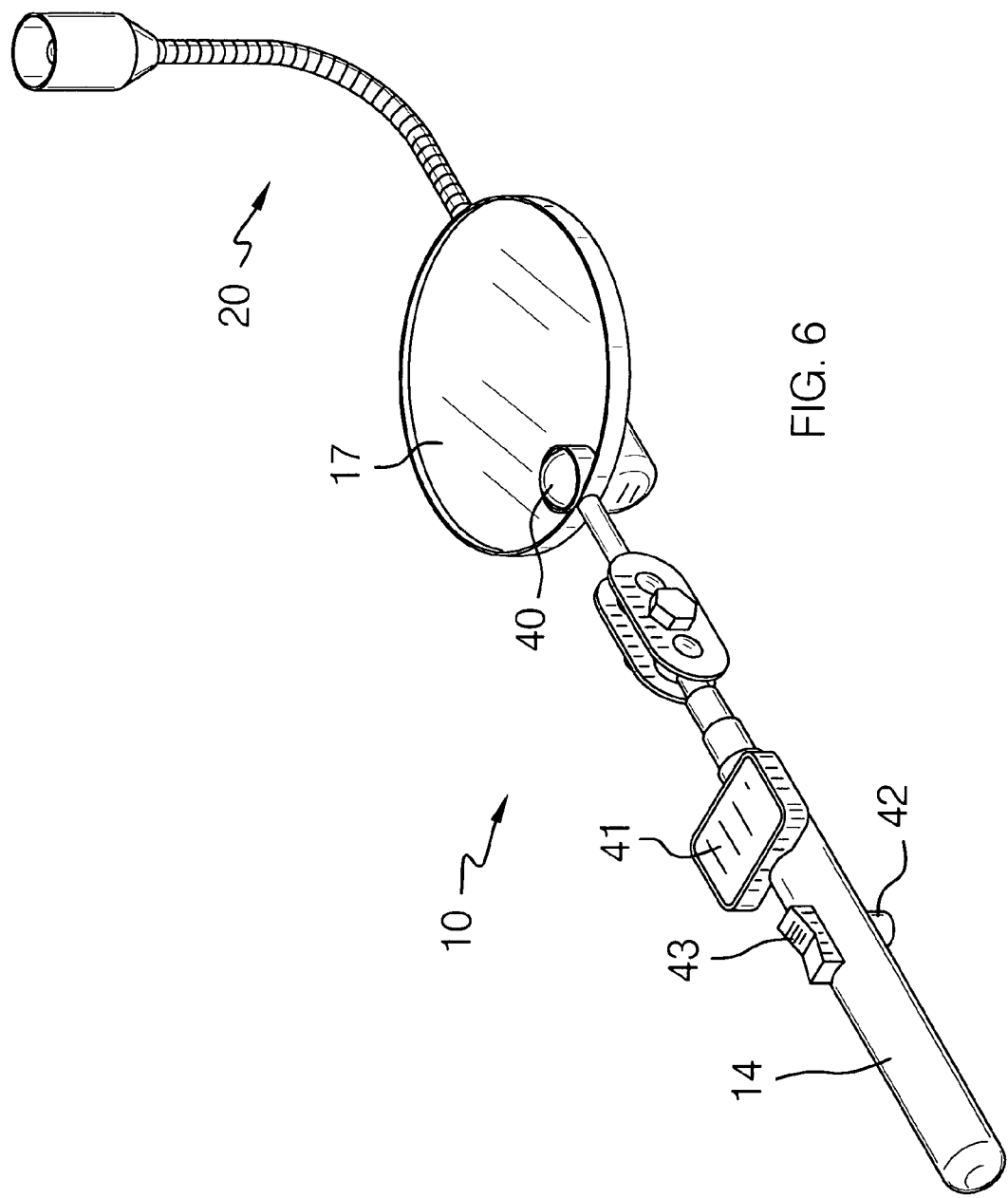
FIG. 6 illustrates an isometric rendering of the front of the invention with a digital camera embodiment.
Figure 7:
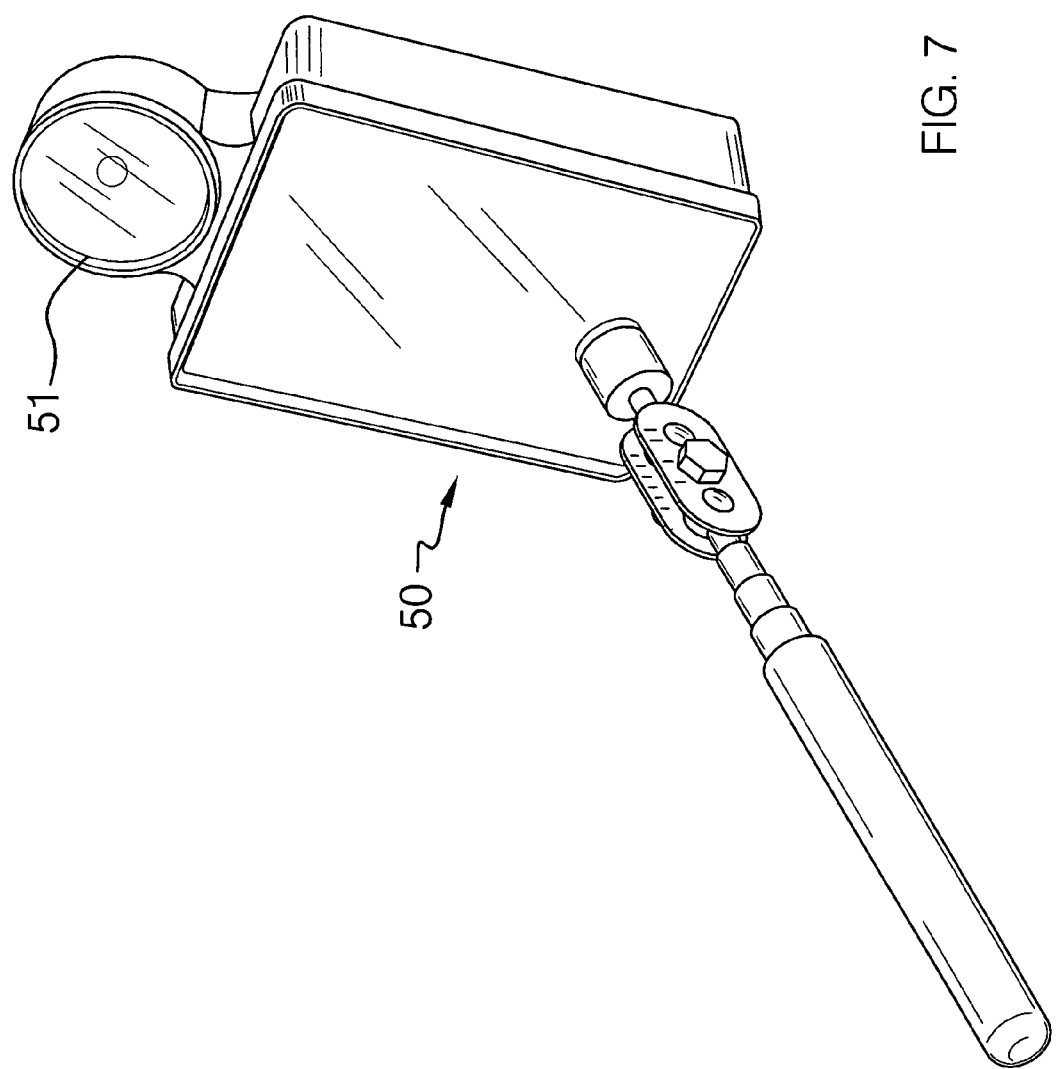
FIG. 7 illustrates an isometric rendering of an alternative embodiment comprising a light permanently mounted atop of the mirror.
Figure 8:
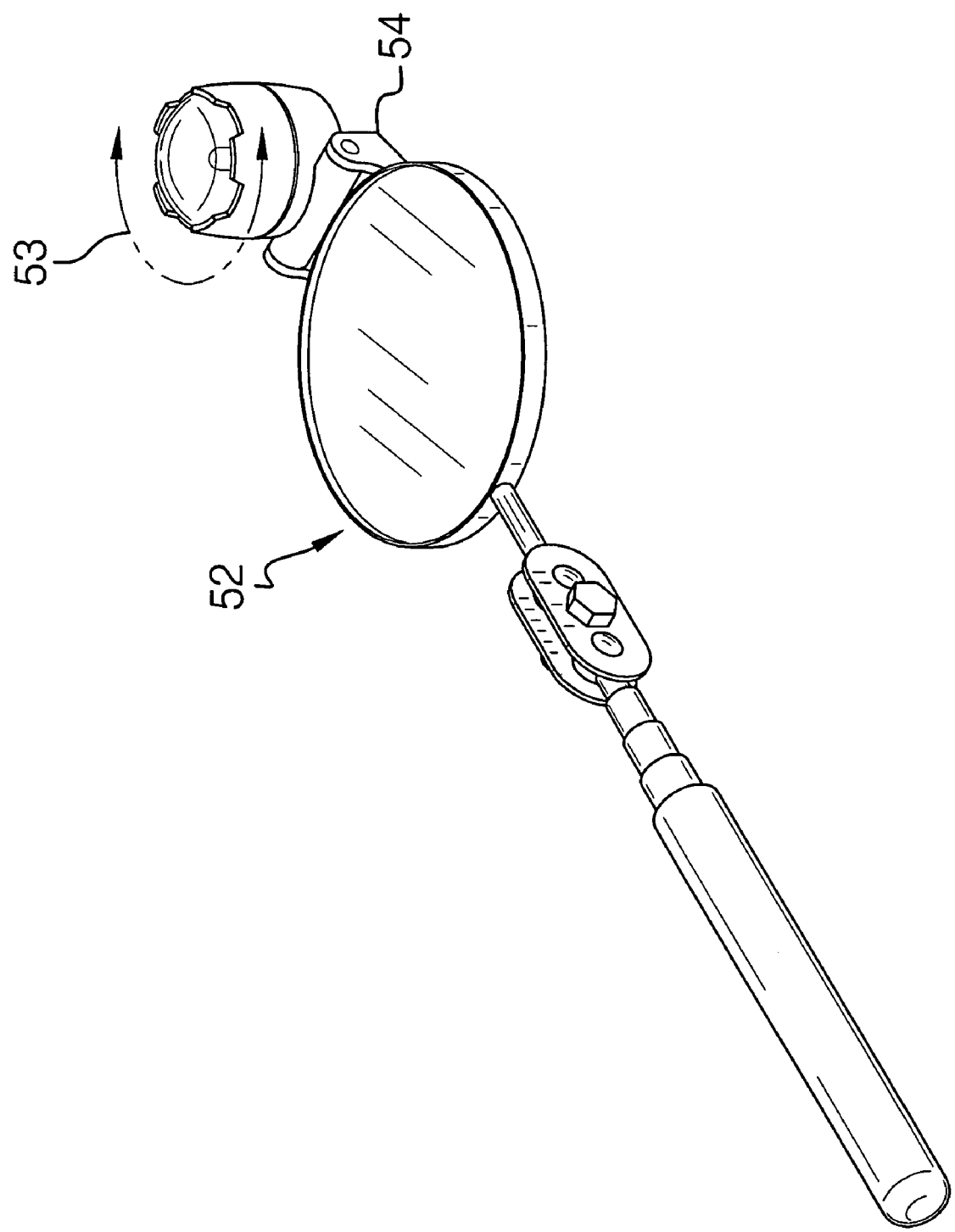
FIG. 8 illustrates an isometric rendering of an alternative embodiment having a hingedly connected light source located at the top of the mirror.

Detailed reference will now be made to a digital camera embodiment of the invention by referring to FIG. 6. The inspection mirror 10 has a camera lens 40 located on the mirror 17. The camera lens is connected to a digital display 41, which is located on the handle grip 14. Also located on the handle grip 14 is a shutter button 42, and a focus or zoom control knob 43.

Detailed reference will now be made to an alternative embodiment having a telescoping inspection mirror 50 having a light source 51 permanently mounted at the top of the mirror.

Detailed reference will now be made to an alternative embodiment having a telescoping inspection mirror 52 and a light source 53, which is connected by a hinge 54 at the top of the mirror. The hinge 54 provides flexibility in the direction of light in that it may be cast over a broader area than that which the mirror is focused upon. The benefit of having a broader area of coverage is that the user may see other areas illuminated that it may not be able to see with the mirror, thus providing better lighting.

The inventor claims:

1. An inspection mirror comprising:
   (a) a telescoping handle;
   (b) a rotating bracket;
   (c) a mirror;
   (d) a handle grip;
   (e) a flex shaft light emitting diode;
      wherein the telescoping handle is connected to the rotating bracket;
      wherein the other end of the rotating bracket is connected to the mirror; and
      wherein the flex shaft light emitting diode is connected to the back of the mirror.

2. The inspection mirror as described in claim 1 wherein a charging jack is located on the flex shaft light emitting diode, which can be charged by an AC adapter/charger.

3. The inspection mirror as described in claim 1 with an integrated digital camera comprising:
   (a) a camera lens located on the mirror;
   (b) a digital display is located on the handle grip;
   (c) a focus or zoom control is located on the handle grip; and
   (d) a shutter button is located on the handle grip.

* * * * *